United States Patent
Hall

[11] 3,897,913
[45] Aug. 5, 1975

[54] LOCKING MECHANISM FOR A VEHICLE RESTRAINT BELT RETRACTOR

[75] Inventor: Arlis Hall, Clawson, Mich.

[73] Assignee: General Motors Corporation, Detroit, Mich.

[22] Filed: May 28, 1974

[21] Appl. No.: 474,016

[52] U.S. Cl. ............................................ 242/107.4
[51] Int. Cl. .......................................... B65h 75/48
[58] Field of Search. 242/107.4; 280/150.5, 150 SB; 297/386–388

[56] References Cited
UNITED STATES PATENTS

| | | | |
|---|---|---|---|
| 3,632,055 | 1/1972 | Stoffel | 242/107.4 |
| 3,664,599 | 5/1972 | Partridge | 242/107.4 |
| 3,809,332 | 5/1974 | Hayashi | 242/107.4 |
| 3,834,646 | 9/1974 | Heath | 242/107.7 |

Primary Examiner—Leonard D. Christian
Attorney, Agent, or Firm—J. A. Kushman

[57] ABSTRACT

A vehicle occupant restraint belt retractor whose belt reel locking against belt unwinding is controlled by a locking mechanism utilizing the combined action of a clutch arrangement frictionally clutched to the reel and a pendulum arrangement responsive to vehicle acceleration or deceleration. The locking mechanism is positively held in either reel locking or nonlocking conditions by an overcenter spring arrangement. The pendulum arrangement moves the locking mechanism from the nonlocking condition to the reel locking condition in response to abrupt vehicle acceleration or deceleration. Belt winding reel rotation causes the clutch arrangement to move the locking mechanism back to the nonlocking condition.

3 Claims, 3 Drawing Figures

LOCKING MECHANISM FOR A VEHICLE RESTRAINT BELT RETRACTOR

BACKGROUND OF THE INVENTION

Vehicle occupant restraint belt arrangements generally utilize belt retractors for securing the restraint belts to the vehicle in a manner that winds and unwinds these belts for use or storage. This type of retractor generally includes a belt reel that winds and unwinds the belt and also utilizes a locking mechanism for selectively locking and unlocking the reel against belt unwinding rotation. Many types of locking mechanisms have been devised in the past in order to lock the reel against the belt unwinding rotation. One such type of locking mechanism utilizes the inertial movement of an inertia member such as a pendulum in response to vehicle acceleration or deceleration in order to lock the retractor. With this type of locking mechanism, a locking member of the mechanism is generally biased by a spring or gravity to a nonlocking position out of engagement with the reel and is moved to a locking position engaging the reel by the pendulum movement in response to the vehicle acceleration or deceleration. Thus, once the vehicle acceleration or deceleration subsides, there is no positive positioning for maintaining the locked condition of the retractor.

SUMMARY OF THE INVENTION

One feature of this invention is that it provides a vehicle occupant restraint belt retractor with an improved locking mechanism for controlling belt unwinding reel rotation by the cooperation of a clutch mechanism frictionally clutched to the retractor belt reel, an inertia arrangement responsive to abrupt vehicle acceleration or deceleration, and a bias which alternately biases the retractor to locked or unlocked conditions to maintain the retractor locked until belt winding occurs or unlocked until the inertia arrangement senses the abrupt vehicle acceleration or deceleration. Another feature of the invention is that the clutch arrangement and the inertia arrangement act on a common control member mounted on the housing for movement from a first position to a second position to engage a locking member of the locking mechanism and thereby move the locking member against the bias of an unlocking spring to a locking position engaging the retractor reel. Another feature of the invention is that the clutch arrangement includes a movable disc frictionally clutched to the belt reel and an arcuate pin and slot connection generated about the axis of reel rotation and extending between the housing and the disc to limit the rotation of the disc with respect to the housing, and an overcenter spring extends between the control member and the retractor housing to alternately bias the control member to either the first or second position so as to provide the bias which alternately positions the retractor in either the locked or unlocked conditions. Another feature of the invention is that the movable disc of the clutch arrangement is clutched to the reel by another disc that is rotatably fixed to the reel and a disc-type spring that frictionally engages both discs to thus provide the clutching therebetween, and a link is pivoted to the clutched movable disc and the control member to thereby move the control member in response to movement of this clutched disc under the limits of the arcuate pin and slot connection. Another feature of the invention is that the inertia arrangement for the retractor takes the form of a pendulum including a head and a weight-connected by a vertically extending arm so that pendulum swinging movement causes the pendulum head to move a plunger upwardly in a manner that moves the control member from the first position to the second position to provide the locking of the retractor, and the overcenter spring is of the helical type with a longitudinal axis that moves across the axis about which the control member pivots so as to provide the bias for the control member and thereby maintain the locking member in the locking position until belt winding through the clutch arrangement and the unlocking spring returns the locking member to the nonlocking position.

BRIEF DESCRIPTION OF THE DRAWINGS

The above-specified features and other features, objects, and advantages of the present invention are readily apparent from the following detailed description of the preferred embodiment and the drawings in which.

DETAILED DESCRIPTION OF THE PREFERRED EMBODIMENT

Figure 1:
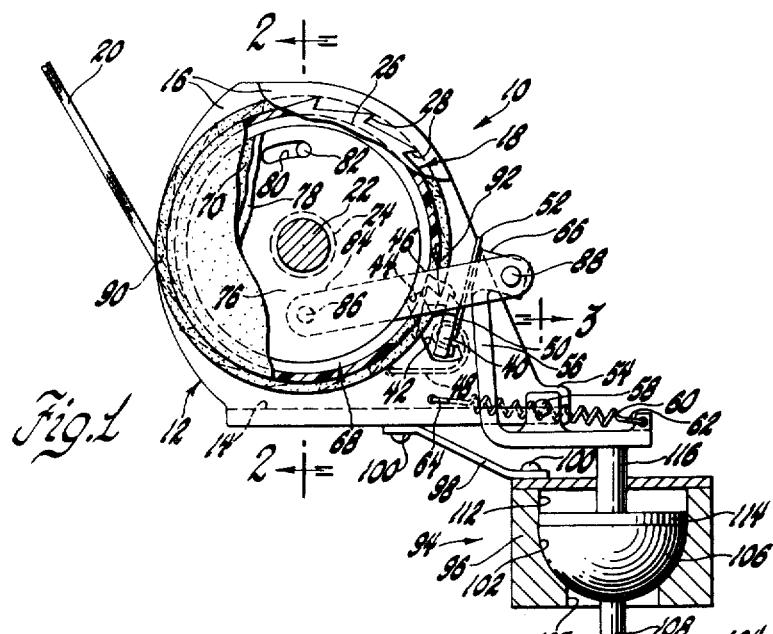
FIG. 1 is a partially broken away side view of a vehicle occupant restraint belt retractor including a locking mechanism constructed in a manner according to this invention.
Figure 2:
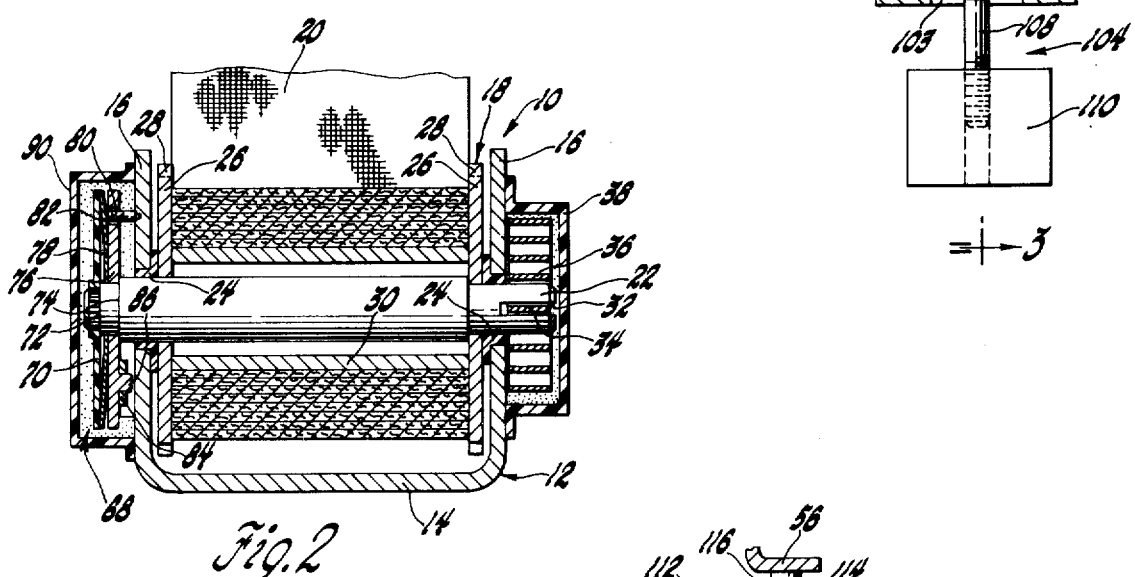
FIG. 2 is a sectional view through the retractor taken generally along line 2-2 of FIG. 1.

Referring generally to FIG. 1 of the drawings, a vehicle occupant restraint belt retractor is generally indicated by 10 and includes a metallic housing indicated by 12. As seen by additional reference to FIG. 2, this housing has a generally U-shaped configuration with a base 14 adapted to be mounted on a vehicle body portion and integral upstanding side walls 16 that oppose each other in a parallel relationship. A belt reel 18 is located between the side walls 16 of the retractor housing and is rotatable in belt winding and unwinding directions to wind and unwind an occupant restraint belt 20. This belt reel includes a central shaft 22 rotatably supported on the housing side walls by bushings 24 as best seen in FIG. 2. Adjacent each bushing 24, an associated end plate 26 of the belt reel is suitably fixed to the shaft 22 such as by splines or welds. The outer periphery of these end plates define circumferentially spaced locking surfaces 28 facing in the clockwise direction of belt unwinding rotation as shown in FIG. 1. A belt drum 30, see FIG. 2, encircles the shaft 22 of the reel and has its ends suitably fixed to the reel end plates 26. Drum 30 attaches the inner end of belt 20 in a suitable manner so that the belt is wound and unwound on the drum during the reel rotation.

The right-hand end of reel shaft 22 as viewed in FIG. 2 extends through the right-hand bushing 24 and defines a slot 32 which receives the inner end 34 of a belt winding spiral spring 36. The outer end of this spring, not shown, is suitably fixed to the adjacent housing side wall 16 so that the spring normally provides a winding bias that rotates the reel 18 counterclockwise as viewed in FIG. 1 to wind belt 20 on the reel. The winding spring 36 and the FIG. 2 right-hand end of shaft 22 are enclosed by a plastic cover 38 of a cup-shaped configuration that is secured to the adjacent housing side wall 16 in any suitable manner.

As seen in FIG. 1, a locking member 40 has one end received within an aperture 42 of the housing side wall 16 closest to the viewer. This aperture has an upwardly and sidewardly projecting slot 44 that allows a locking projection 46 of the locking member to pass through this side wall as the locking member is inserted into the housing between the side walls. The other end of the locking member, although not shown, is received within a bow tie shaped aperture in the housing side wall 16 farthest from the viewer of FIG. 1. The locking member 40 is thus rotatably supported on the retractor housing for movement between the nonlocking position of FIG. 1 and a locking position counterclockwise of this locking position. The locking projection 46 engages a selected pair of the locking surfaces 28 on the reel end plates 26 while in the locking position and thus prevents belt unwinding reel rotation in the clockwise direction of FIG. 1 to thereby prevent unwinding of belt 20 from the belt reel 18. An unlocking spring 48 shown in FIG. 1 is suitably mounted on the retractor housing 12 and engages locking member 40 to bias the locking member clockwise to the nonlocking position with a torque $T_1$. Also, the end of locking member 40 closest to the viewer of FIG. 1 supports a clip 50 in any suitable manner and this clip has a projection 52 that extends upwardly from the locking member on the outside of the adjacent housing side wall 16.

The lower right-hand portion of the housing side wall 16 closest to the viewer of FIG. 1 includes a flange 54 that pivotally supports an L-shaped control member 56 by a suitable pin 58. A helical spring 60 has one end 62 secured to the righthand lower end of control member 56 and has another end 64 secured to the housing side wall 16. This control member 56 is movable about the axis of pin 58 from the first position shown in FIG. 1 in a counterclockwise direction to a second position so that engagement of the upper left-hand end portion 66 of this control member with the projection 52 of the locking member clip 50 pivots the locking member 40 counterclockwise to the locking position in engagement with belt reel 18 to prevent belt unwinding. As this pivoting of control member 56 occurs, the longitudinal axis of helical spring 60 moves upwardly over the axis of pin 58 to maintain the control member in the counterclockwise second position holding locking member 40 in the locking position. Movement of the control member 56 back to the first position shown moves the longitudinal axis of helical spring 60 below the center of pin 58 to thus maintain the control member 56 in this position. This spring 60 thus provides an overcenter arrangement that alternately biases the control member 56 to either the first or second position.

A clutch arrangement generally indicated by 68 extends between the belt reel 18 and the upper end portion 66 of control member 56 to control the locking of retractor 10. This clutch arrangement includes a first disc 70, as seen in FIG. 2, which is fixedly secured to the outer end of reel shaft 22 in any suitable manner such as by splines. The axial position of this disc with respect to the shaft is located by a shoulder 72 of the shaft. Likewise, a shoulder 74 of the shaft axially positions a movable disc 76 that is rotatable with respect to this shaft. A disc-type spring 78 is located between discs 70 and 76 and frictionally clutches disc 76 to disc 70. The fixed axial position of these discs with respect to each other and the predetermined frictional force generated between the spring and the discs controls the amount of clutching force necessary to cause slippage of the clutch arrangement.

The movable disc 76 of clutch arrangement 68 defines an arcuate slot 80 generated about the axis of belt reel rotation. A pin 82 mounted on the housing side wall adjacent disc 76 is received by this slot 80 to limit the rotation of disc 76 by the limits of this pin and slot connection. A link 84 of the clutch arrangement has one of its ends pivoted to disc 76 by an integral pin 86 projecting from this disc. The other end of link 84 is pivoted to the upper end portion 66 of control member 56 by a pin 88 as seen in FIG. 1. This clutch arrangement 68 is enclosed by a plastic cover 90 mounted on the adjacent housing side wall 16, and this cover defines an aperture 92, FIG. 1, through which the link 84 extends outwardly for connection to the control member 56.

The frictional force of clutch arrangement 68 that is generated between the discs 70 and 76 during belt winding or unwinding bodily pushes or pulls link 84 to the right or left to urge control member 56 clockwise or counterclockwise with the same effort. During belt unwinding, this effort produces a torque $T_2$ urging locking member 40 toward the locking position by engagement of the upper end portion 66 of the control member with the clip portion 52 on locking member 40. This torque $T_2$ is less than the torque $T_1$ generated by the unlocking spring 48. Thus, when the belt 20 is unwound from a storage position for use, the counterclockwise pull that the clutch arrangement exerts on control member 56 is not sufficient to move the control member so that spring 60 moves above pin 58 and thereby moves the locking member 40 to its locking position. Rather, the clutch arrangement allows relative slippage between the discs 70 and 76 so that the belt reel is free to rotate and unwind the belt. However, when the retractor is in its locked condition, the force that spring 60 exerts on control member 56 urges the locking member 40 into its locking position with an effort that produces a torque $T_3$ on the locking member. Torque $T_3$ is greater than the torque $T_1$ which unlocking spring 48 exerts and thus positively maintains the locking member 40 in its locking position against the bias of unlocking spring 48. However, torque $T_3$ is less than the totals of torques $T_1$ and $T_2$ so that the additional torque generated by the clutch arrangement assists the unlocking spring 48 to move the locking member 40 back to its unlocking position as the belt 20 is wound on the belt reel 18. Thus, when the winding spring 36 of belt reel 18 moves the belt reel in the belt winding direction, the retractor is thereby moved to an unlocked condition due to the balancing of the torques acting on the locking member 40 in the manner specified.

Figure 3:
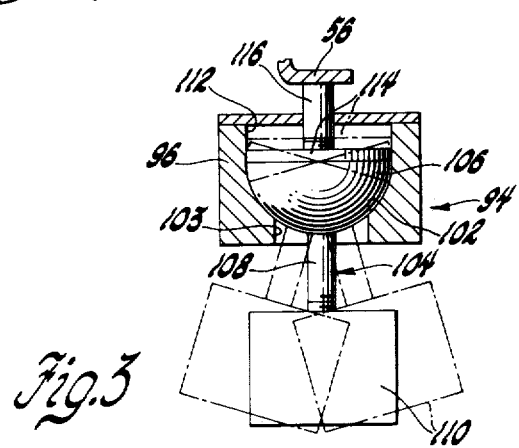
FIG. 3 is a sectional view through a pendulum arrangement of the retractor taken generally along line 3-3 of FIG. 1.

The retractor 10 is moved to its locked condition by an inertia or pendulum arrangement generally indicated by 94 as shown in FIGS. 1 and 3. This pendulum arrangement includes a base 96 mounted on the retractor housing base wall 14 by a bracket 98, FIG. 1, and secured in position by screw bolts 100. The base 96 defines an upwardly opening partial spherical seat 102 above a lower aperture 103. A pendulum 104 has a head 106 seated by the seat 102 and an arm 108 whose upper end is suitably secured to the pendulum head. The pendulum arm extends downwardly through the base aperture 103 and is threaded onto a weight 110. The pendulum normally depends downwardly in a vertical orientation as shown by solid lines in FIG. 3 and swings from this orientation to one of the tipped phantom line orientations in response to abrupt vehicle acceleration or deceleration in any horizontal direction. Above the seat 102, the base 96 defines a cylinder 112 that slidably receives a plunger 114. The upper side of this plunger includes a rod portion 116 that extends upwardly and engages the lower righthand portion of control member 56.

When the vehicle carrying retractor 10 is accelerated or decelerated, the vertical forces present tend to swing pendulum 104 to a tilted orientation. This causes the pendulum head 106 to tilt and thereby force plunger 114 upwardly in a manner that urges the locking member toward the locking position. Vehicle acceleration or deceleration abrupt enough to cause pendulum arrangement 94 to move spring 60 above pin 58 and apply a torque to the locking member 40 in the locking direction greater than torque $T_1$ of the unlocking spring 48 will thus lock the retractor. Also, when a belted vehicle occupant moves in response to vehicle acceleration or deceleration and consequently unwinds belt 20, the belt reel rotation via clutch arrangement 68 exerts a force on control member 56 tending to lock the locking member 40. This reel rotation thus lowers the level of vehicle acceleration or deceleration necessary to cause the locking of the retractor. After the vehicle acceleration or deceleration forces have subsided, the pendulum 104 returns to its vertical orientation but the retractor remains in its locked condition until the belt 20 again is wound on the belt reel 18 as previously explained.

This invention thus provides an improved locking mechanism for a vehicle occupant restraint belt retractor.

What is claimed is:

1. In a vehicle occupant restraint belt retractor including a housing adapted to be mounted on a vehicle, a belt reel rotatably mounted on the housing for movement in belt winding and unwinding directions and including locking surfaces spaced circumferentially about the axis of reel rotation, a restraint belt secured to the reel so as to be wound and unwound therefrom during the reel rotation, and a winding spring normally biasing the reel in the belt winding direction, a locking mechanism for the retractor comprising:

a locking member pivotally mounted on the housing for movement between a locking position in engagement with one of the reel locking surfaces to prevent belt unwinding and a nonlocking position out of engagement with the reel to allow belt unwinding;

an unlocking spring normally biasing the locking member to the nonlocking position with a torque $T_1$;

a control member mounted on the housing for movement from a first position to a second position so as to engage the locking member and move the same to the locking position;

a clutch arrangement extending between the belt reel and the control member and frictionally clutched to the reel so that belt unwinding urges the control member toward the second position by an effort that tends to move the locking member to the locking position with a torque $T_2$, torque $T_2$ being less than torque $T_1$ so that belt unwinding does not normally move the locking member to the locking position and thereby terminate such unwinding, and the clutching of the reel to the control member tending to move the control member from the second posititon to the first position when the winding spring winds the belt on the reel with the locking member initially in the locking position so that this movement of the control member allows the normal bias of the unlocking spring to move the locking member to the nonlocking position and thereby permits subsequent belt unwinding;

a vehicle acceleration or deceleration responsive inertia arrangement mounted relative to the retractor housing and having a movable portion that engages the control member to move this member to the second position in response to abrupt vehicle acceleration or deceleration of a predetermined level and to thereby move the locking member to the locking position against the bias of the unlocking spring, belt unwinding during such vehicle acceleration or deceleration causing the clutch arrangement to cooperate with the inertia arrangement in moving the control member so as to move the locking member to the locking position and this cooperation lessening the level of vehicle acceleration or deceleration necessary to cause the movement of the locking member to the locking position against the bias of the unlocking spring; and overcenter means alternately biasing the control member to either the first or second position by an effort that holds the locking member in the locking position with a torque $T_3$, torque $T_3$ being greater than torque $T_1$ so that the unlocking spring does not move the locking member from the locking position to the nonlocking position without the assist of the clutch arrangement as the belt is wound on the reel, and torque $T_3$ being less than the total of torques $T_1$ and $T_2$ so that the unlocking spring and the clutch arrangement act against the overcenter means to move the locking member from the locking position to the nonlocking position as the belt is wound on the reel.

2. In a vehicle occupant restraint belt retractor including a housing adapted to be mounted on a vehicle, a belt reel rotatably mounted on the housing for movement in belt winding and unwinding directions and including locking surfaces spaced circumferentially about the axis of reel rotation, a restraint belt secured to the reel so as to be wound and unwound therefrom during the reel rotation, and a winding spring normally biasing the reel in the belt winding direction, a locking mechanism for the retractor comprising:

a locking member pivotally mounted on the housing for movement between a locking position in engagement with one of the reel locking surfaces to prevent belt unwinding and a nonlocking position out of engagement with the reel to allow belt unwinding;

an unlocking spring normally biasing the locking member to the nonlocking position with a torque $T_1$;

a control member mounted on the housing for movement from a first position to a second position so as to engage the locking member and move the same to the locking position;

a clutch arrangement including a disc frictionally driven by the belt reel, an arcuate pin and slot connection generated about the axis of reel rotation and extending between the housing and the disc to limit the rotation of the disc with respect to the housing, and a link pivoted at one end thereof to the disc and at the other end thereof to the control member so that belt unwinding urges the control member toward the second position by an effort that tends to move the locking member to the locking position with a torque $T_2$, torque $T_2$ being less than torque $T_1$ so that belt unwinding does not normally move the locking member to the locking position and thereby terminate such unwinding, and the clutch arrangement tending to move the control member from the second position to the first position when the winding spring winds the belt on the reel with the locking member initially in the locking position so that this movement of the control member allows the normal bias of the unlocking spring to move the locking member to the nonlocking position and thereby permits subsequent belt unwinding;

a vehicle acceleration or deceleration responsive inertia arrangement mounted on the retractor housing and including a movable portion that engages the control member to move this member to the second position in response to abrupt vehicle acceleration or deceleration of a predetermined level and to thereby move the locking member to the locking position against the bias of the unlocking spring, belt unwinding during such vehicle acceleration or deceleration causing the clutch arrangement to cooperate with the inertia arrangement in moving the control member so as to move the locking member to the locking position, and this cooperation lessening the level of vehicle acceleration or deceleration necessary to cause the movement of the locking member to the locking position against the bias of the unlocking spring; and an overcenter spring extending between the control member and the housing to alternately bias the control member to either the first or second position and this spring holding the control member in the second position with an effort that holds the locking member in the locking position with a torque $T_3$, torque $T_3$ being greater than torque $T_1$ so that the unlocking spring does not move the locking member from the locking position to the nonlocking position without the assist of the clutch arrangement as the belt is wound on the reel, and torque $T_3$ being less than the total of torques $T_1$ and $T_2$ so that the unlocking spring and the clutch arrangement act against the overcenter spring to move the locking member from the locking position to the nonlocking position as the belt is wound on the reel.

3. In a vehicle occupant restraint belt retractor including a housing adapted to be mounted on a vehicle, a belt reel rotatably mounted on the housing for movement in belt winding and unwinding directions and including locking surfaces spaced circumferentially about the axis of reel rotation, a restraint belt secured to the reel so as to be wound and unwound therefrom during the reel rotation, and a winding spring normally biasing the reel in the belt winding direction, a locking mechanism for the retractor comprising:

a locking member pivotally mounted on the housing for movement between a locking position in engagement with one of the reel locking surfaces to prevent belt unwinding and a nonlocking position out of engagement with the reel to allow belt unwinding;

an unlocking spring normally biasing the locking member to the nonlocking position with a torque $T_1$;

a control member pivotally mounted on the housing for movement from a first position to a second position so as to engage the locking member and move the same to the locking position;

a clutch arrangement including a first disc rotatably driven with the belt reel, a second disc axially fixed with respect to the first disc along the axis of reel rotation but rotatable with respect to the first disc, a disc-type spring extending between the first and second discs so as to frictionally clutch the second disc to the reel, an arcuate pin and slot connection generated about the axis of reel rotation and extending between the housing and second disc to limit rotation of the latter with respect to the former, and a link pivoted at one end thereof to the second disc and at the other end thereof to the control member so that belt unwinding urges the control member toward the second position by an effort that tends to move the locking member to the locking position with a torque $T_2$, torque $T_2$ being less than torque $T_1$ so that belt unwinding does not normally move the locking member to the locking position and thereby terminate such unwinding, and the clutch arrangement tending to move the control member from the second position to the first position when the winding spring winds the belt on the reel with the locking member initially in the locking position so that this movement of the control member allows the normal bias of the unlocking spring to move the locking member to the nonlocking position and thereby permits subsequent belt unwinding;

a pendulum arrangement mounted on the retractor housing and including a base having a partial spherical seat, a pendulum including a head and a weight with an arm extending therebetween, the pendulum head being seated on the seat of the base so that the arm extends downwardly in a vertical direction to the weight whose inertial force swings the pendulum in response to vehicle acceleration or deceleration in any horizontal direction, and a plunger slidably mounted on the base so as to be moved upwardly by the pendulum head as the pendulum swings, the plunger including a portion which engages the control member as the plunger is moved upwardly and thereby moves the control member to the second position and the locking member to the locking position against the bias of the unlocking spring when the vehicle acceleration or deceleration exceeds a predetermined level, belt unwinding during such vehicle acceleration or deceleration causing the clutch arrangement to cooperate with the pendulum arrangement in moving the control member so as to move the locking member to the locking position, and this cooperation lessening the level of vehicle acceleration or deceleration necessary to cause the movement of the locking member to the locking position against the bias of the unlocking spring; and a helical spring extending between the control member and the housing so that the longitudinal axis thereof moves overcenter of the axis of control member movement in a manner that alternately biases the control member to either the first or second position and this spring holding the control member in the second position by an effort that holds the locking member in the locking position with a torque $T_3$, torque $T_3$ being greater than torque $T_1$ so that the unlocking spring does not move the locking member from the locking position to the nonlocking position without the assist of the clutch arrangement as the belt is wound on the reel, and torque $T_3$ being less than the total of torques $T_1$ and $T_2$ so that the unlocking spring and the clutch arrangement act against the helical spring to move the locking member from the locking position to the nonlocking position as the belt is wound on the reel.

* * * * *